United States Patent [19]
Barcomb et al.

[11] 3,794,903
[45] Feb. 26, 1974

[54] VERNIER CONTROL FOR A STEPPER MOTOR

[75] Inventors: James G. Barcomb, Endicott; John Mako, Vestal, both of N.Y.

[73] Assignee: International Business Machines Corporation, Armonk, N.Y.

[22] Filed: Dec. 14, 1972

[21] Appl. No.: 315,063

[52] U.S. Cl. ............................................. 318/696
[51] Int. Cl. .......................................... G05b 19/40
[58] Field of Search ............ 318/138, 254, 685, 696

[56] References Cited
UNITED STATES PATENTS
| | | | |
|---|---|---|---|
| 3,239,738 | 3/1966 | Welch | 318/696 |
| 3,324,369 | 6/1967 | Marakis | 318/696 |
| 3,573,592 | 4/1971 | Agin | 318/696 |

Primary Examiner—Bernard A. Gilheany
Assistant Examiner—Thomas Langer
Attorney, Agent, or Firm—Francis V. Giolma

[57] ABSTRACT

A multi-position switch is connected between the windings of a stepper motor and a pair of triggers which are connected to operate in a reflected binary mode for sequentially energizing the windings of the motor in response to a series of motor advance pulses causing the motor to advance in a stepwise fashion. The multi-position switch has one pole connected to each output of the triggers and has the different positions of each pole so connected to a different motor winding that movement of the switch in one direction causes the motor to advance one step for each position and movement in the other direction causes it to reverse one step for each position.

6 Claims, 5 Drawing Figures

VERNIER CONTROL FOR A STEPPER MOTOR

BACKGROUND OF THE INVENTION

1. Field of the Invention

The invention relates generally to stepper motors and it has reference in particular to a manual control system for effecting vernier operation of a stepper motor without advancing the usual drive triggers.

2. Description of the Prior Art

U. S. Pat. No. 3,239,738 which issued on Mar. 8, 1966 to E. C. Welch discloses the use of special interlocking switch means 14–17 responsive to input pulses to sequentially energize the motor windings A-D.

U. S. Pat. No. 3,324,369 which issued on June 6, 1967 to M. J. Markakis discloses the use of logic means 50 in conjunction with a reversing switch 45 for stepping a motor 10 clockwise or counterclockwise.

SUMMARY OF THE INVENTION

Generally stated it is an object of this invention to provide an improved vernier control for a stepper motor.

More specifically it is an object of this invention to provide a manual switch for incrementing a stepper motor without altering the normal stepper motor drive triggers from their reset position.

It is an object of the present invention to provide for using a single multi-pole multi-position switch for operating stepper motor independently of the usual drive triggers.

Yet another object of the invention is to provide for using a single-pole multi-position switch with logic circuits for incrementing a stepper motor without changing the reset condition of the usual drive triggers.

Still another object of the invention is to provide for moving a stepper motor a predetermined number of steps without affecting the normal operating sequence of the motor triggers.

Yet another important object of the invention is to provide for bidirectional movement of a stepper motor without changing the reset condition of the motor drive triggers.

The foregoing and other objects, features and advantages of the invention will be apparent from the following more particular description of preferred embodiments of the invention as illustrated in the accompanying drawing.

DESCRIPTION OF A PREFERRED EMBODIMENT

Figure 1:
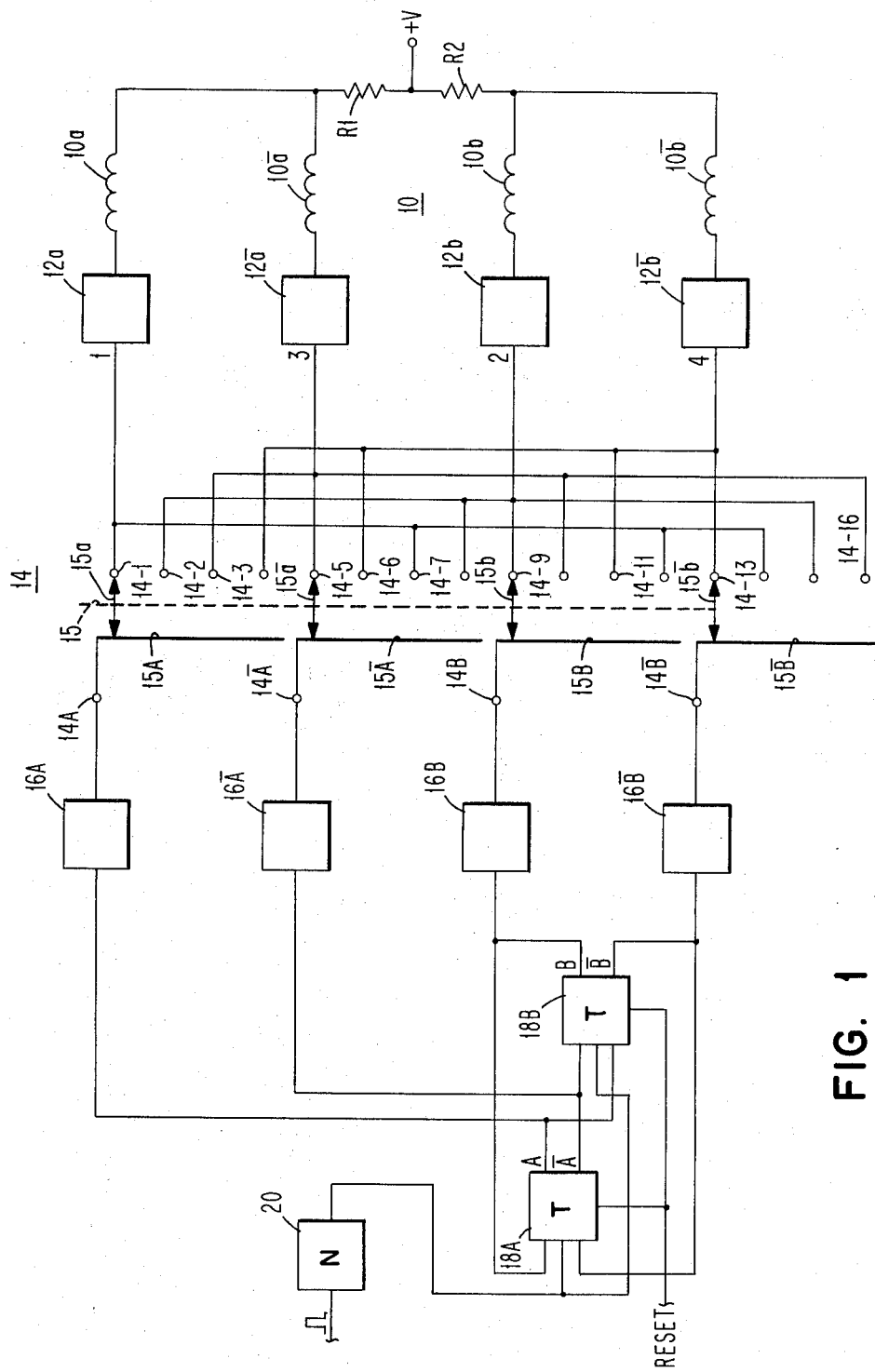
FIG. 1 is a schematic circuit diagram of a stepper motor control circuit embodying the invention in one of its forms.

Referring to FIG. 1 the reference numeral 10 denotes generally a stepper motor of the type described in the AIEE paper No. 61–650 presented at the AIEE Northeastern District Meeting, Hartford, Connecticut May 17–19, 1961 and entitled "Characteristics of a Synchronous Conductor Motor" by Arthur E. Snowden and Elmer W. Madsen. The motor 10 has bifilar windings $10a$, $10\overline{a}$, $10b$, $10\overline{b}$ which are connected at one end through resistors R1 and R2 to a positive source of voltage. The other ends of the windings are connected by means of drivers $12a$, $12\overline{a}$, $12b$, $12\overline{b}$ to ground. The drivers are controlled by four predrivers $16\overline{A}$ $16A$, $16B$ and $16\overline{B}$ in response to selective energization from the on and off outputs A, $\overline{A}$, B, $\overline{B}$ of a pair of triggers 18A and 18B which are connected to step in a reflected binary code in response to motor advance pulses applied thereto through an inverter 20.

Figure 3:
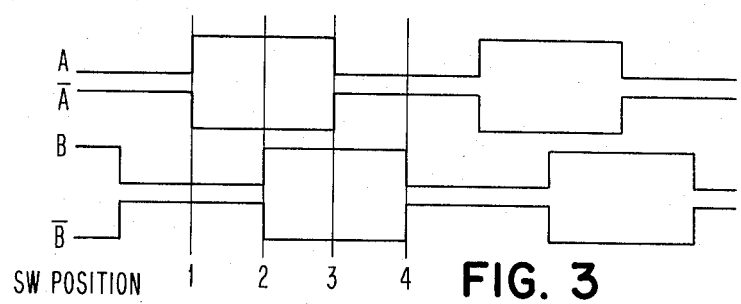
FIG. 3 is a showing of the output waveforms of the drive triggers of FIG. 1 showing the various energization conditions of the windings for the different switch positions.

When the triggers 18A and 18B are in the reset condition it is sometimes desirable to advance the motor one or more steps such as for positioning a form to a particular line. This is accomplished by means of a multi-pole switch 14 which is connected between the predrivers $16A$, $16\overline{A}$, $16B$, $16\overline{B}$ and the drivers $12a$, $12\overline{a}$, $12b$, $12\overline{b}$. The switch 14 has four input terminals $14A$, $14\overline{A}$, $14B$, and $14\overline{B}$ which are connected to the predrivers $16A$, $16\overline{A}$, $16B$, and $16\overline{B}$ respectively. A movable element 15 of the switch has contact members $15a$, $15\overline{a}$, $15b$, $15\overline{b}$ which are connected to the terminals $14A$, $14\overline{A}$, $14B$, and $14\overline{B}$ by means of common conductive segments $15A$, $15\overline{A}$, $15B$, $15\overline{B}$ to a plurality of output terminals 14-1 through 14-16. These output terminals are connected to the drivers $12a$, $12\overline{a}$, $12b$, $12\overline{b}$ so that in successive positions of the movable switch member 15 the terminal $14\overline{A}$ may be sequentially connected to the drivers $12\overline{a}$, $12\overline{b}$, $12a$ and $12b$. Since the $\overline{A}$ and $\overline{B}$ terminals of the triggers 18A and 18B will be energized when the triggers are in the reset condition the predriver $16\overline{B}$ will likewise be connected to the driver $12b$ $12a$, $12b$ and $12\overline{a}$ in sequence. This sequential energization of the windings $10a$, $10\overline{a}$, $10b$ and $10\overline{b}$ as the movable switch element is advanced from one position to the other, causes the stepper motor 10 to advance sequentially. The energization of the motor windings follows the pattern indicated by the curves in FIG. 3 for the different switch positions 1, 2, 3 and 4. as designated. The movable element 15 may comprise a circular insulating wafer with the contact members $15\overline{a}$, $15a$, $15b$ and $15\overline{b}$ connecting stationary segments $15A$, $15\overline{A}$, $15B$ and $15\overline{B}$ to the terminals 14-1 through 14-16 in continuous rotation.

Figure 2:
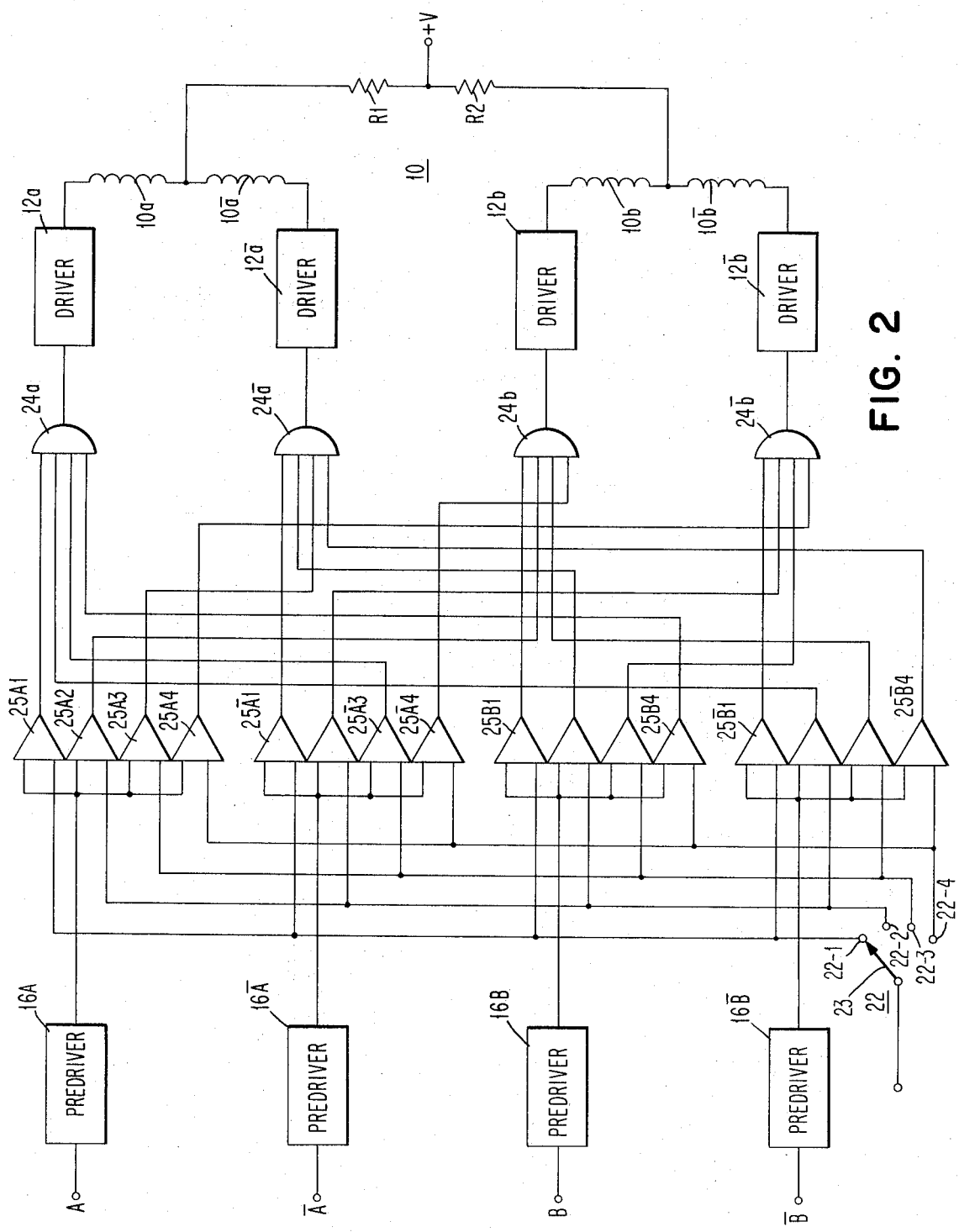
FIG. 2 is a partial schematic circuit of a vernier control circuit which may be used in the control circuit of FIG. 1.

Referring to FIG. 2 the reference numeral 10 denotes as previously a stepper motor having bifilar windings $10a$, $10\overline{a}$, $10b$ and $10\overline{b}$ which are connected through resistors R1 and R2 to a plus source of voltage +V. The other ends of the windings are connected to ground by means of drivers $12a$, $12\overline{a}$, $12b$ and $12\overline{b}$ under the control or predrivers $16A$, $16\overline{A}$, $16B$ and $16\overline{B}$ respectively. Instead of using a multi-pole multi-position switch as in FIG. 1 the drivers $12a$, $12\overline{a}$, $12b$ and $12\overline{b}$ are energized through OR circuits $24a$, $24\overline{a}$, $24b$ and $24\overline{b}$ from a plurality of AND circuits 25A1 through 25A4, $25\overline{A}1$ through $25\overline{A}4$, 25B1 theough 25B4 and $25\overline{B}1$ through $25\overline{B}4$ under the control of a single-pole multi-position switch 22 having a movable switch arm 23 comparable to positions 22-1, 22-2, 22-3 and 22-4 to gate different ones of the AND circuits for energizing the motor windings 10a, 10ā, 10b and 10b̄. For example, with the switch 22 in position 22-1 winding 10ā will be energized through driver 12ā through OR 24ā and AND 25A1. Winding 10b will likewise be energized through driver 12b OR 24b and AND 25B1. With and switch 22 moved to positions 22-2, 22-3 and 22-4 windings 12b - 12a, 12a - 12b and 12b - 12ā will be energized respectively to advance the stepper motor one step for each advance of the switch.

Figure 4:
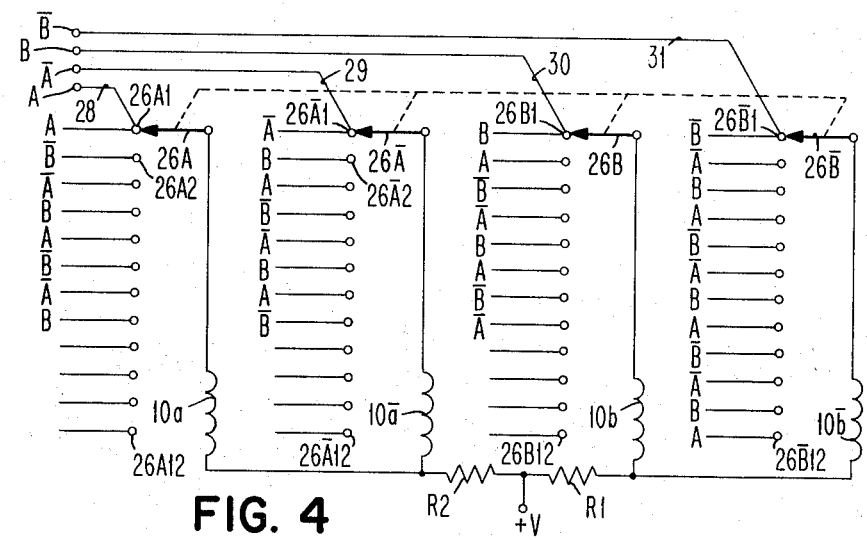
FIG. 4 is a schematic circuit diagram of another vernier control circuit which may be used in the control system of FIG. 1

Referring to FIG. 4 the motor windings 10a, 10ā, 10b and 10b̄ are again connected at one end to a positive source of voltage through resistors R1 and R2. The other ends of the motor windings may be connected by means of movable switch arms 26A, 26Ā, 26B and 26B̄ to conductors 28, 29, 30 and 31 which are respectively connected to the A, Ā, B, and B̄ outputs of the predrivers.

By providing the switch member 26A with a plurality of contacts 26A1 to 26A2 and the switch members 26Ā, 26B and 26B̄ with like contacts which are connected in a predetermined sequential order to the conductors 28, 29, 30 and 31 movement of the switch arms 26A, 26Ā, 26B and 26B̄ can be made to cause the energization of the motor windings 10a, 10a', 10b and 10b' to advance in a predetermined sequence causing stepwise operation of the stepper motor.

Figure 5:
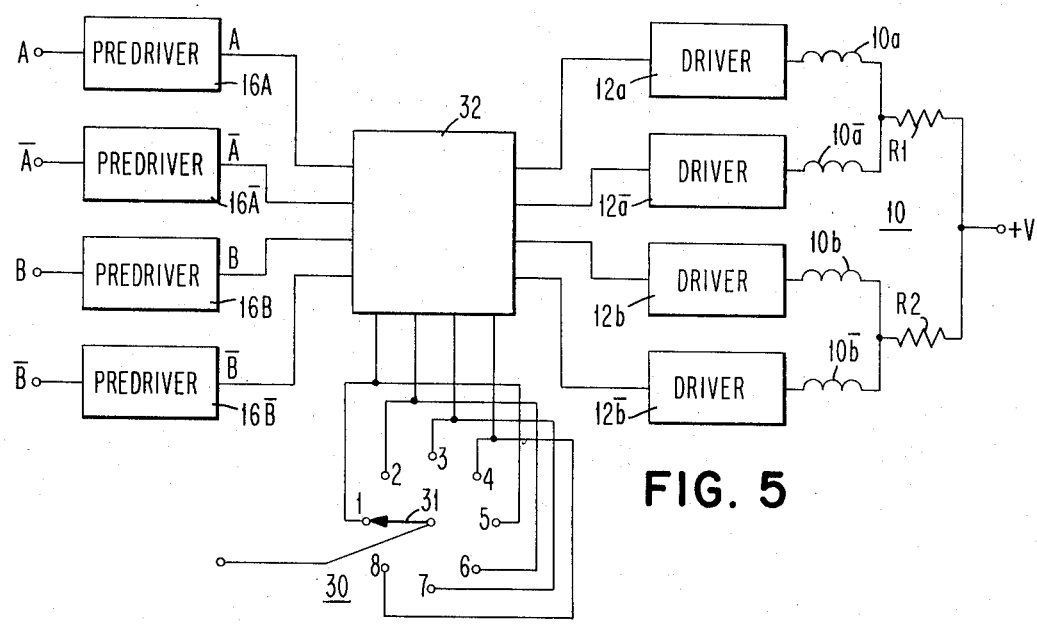
FIG. 5 is a schematic circuit diagram of a vernier control circuit which may also be used with the motor control circuit of FIG. 1.

Referring to FIG. 5 it will be seen that a multiposition switch 30 having a movable switch arm 31 movable to engage stationary contacts 1 through 8 which are connected to logic circuitry 32 comprising a plurality of AND circuits as shown in FIG. 2 may be used to selectively control the energization of the winding 10a, 10ā, 10b and 10b̄ of a stepper motor 10 to advance the motor one step at a time without affecting the reset condition of the novel drive triggers.

From the above description and the accompanying drawing it will be realized that this invention provides a simple and effective method for obtaining vernier operation of a stepper motor when the normal drive triggers are in the reset condition. the motor may be advanced any number of steps without affecting the normal operation of the motor under control of the drive triggers. If the switch is operated in the reverse direction the motor operates in the reverse direction also.

While the invention has been particularly shown and described with reference to preferred embodiments thereof, it will be understood by those skilled in the art that various changes in form and details may be made therein without departing from the spirit and scope of the invention.

What is claimed is:

1. In combination with a stepper motor having an armature and a plurality of operating windings with a pair of bistable switching means having an on and off condition and on and off output connected to said windings to effect energization thereof in a predetermined stepping sequence for effecting step-by-step advance motion of said motor armature, switch means connected between the outputs of said bistable switching means and said winding operable with both of said bistable switching means in the off condition to different positions in sequence to sequentially connect said bistable switching means off outputs to different ones of said windings in a progressively advancing order to cause said motor armature to advance one step for each operation of said switch means without altering the off operating condition of said bistable switching means.

2. The invention as defined in claim 1 characterized by said switch means including a plurality of groups of AND gates and AND gates of each group having one input connected to a different output of said bistable switching means and having an output connected to a different one of said operating windings, and a multi-position manual switch with each position connected to provide another input for a corresponding one of said AND gates in each group.

3. The invention as defined in claim 1 characterized by said switch means comprising a multi-pole multi-position switch with each pole connected to a different motor winding and successive positions connected to a different one of said bistable switching means output in the same sequence but each advanced one sequence step.

4. The invention as defined in claim 2 characterized by said multi-position switch having 2-n positions where n is the number of motor windings and also the number of bistable switching means outputs.

5. The invention as defined in claim 4 characterized by each of said bistable switching means comprising a trigger having off and on outputs connected to said operating windings by driver circuits, and said switch means being connected in series circuit relation with said trigger outputs and said operating windings.

6. The invention as defined in claim 1 characterized by said switch means comprising a four-pole four-position rotary switch with each of said poles connected to a different trigger output and connecting said output to a different motor winding in each position in sequence to advance said motor armature one step for each position to which said switch is advanced.

* * * * *